June 25, 1935.  H. L. BERNARDE  2,005,884
ELECTRICAL MEASURING AND REGULATING SYSTEM Filed July 26, 1933

WITNESSES:

INVENTOR
Henry L. Bernarde
BY
ATTORNEY

Patented June 25, 1935

2,005,884

UNITED STATES PATENT OFFICE 2,005,884

ELECTRICAL MEASURING AND REGULATING SYSTEM

Henry L. Bernarde, Kearny, N. J., assignor to Westinghouse Electric & Manufacturing Company, East Pittsburgh, Pa., a corporation of Pennsylvania Application July 26, 1933, Serial No. 682,263

5 Claims. (Cl. 172—239)

My invention pertains to electronic control systems and more particularly to systems wherein a delicate measuring instrument controls comparatively heavy apparatus, such as a recorder, or other device.

Previously, in systems of this nature, it has been necessary to employ various mechanically balanced systems carrying electrical contacts. Such apparatus introduced serious errors, since it had many moving parts, with high inertia and friction, and the electrical contacts were apt to stick or fail to complete the associated circuits. Such systems were very slow acting, or they had a tendency to overrun and hunt.

It is accordingly an object of my invention to provide an accurate follow-up system which is quick-acting, does not overrun or hunt, and which may be applied for controlling heavy apparatus by a highly sensitive instrument.

A further object of my invention is to provide a self-balancing electronic recording system, which utilizes sensitive vacuum tubes, which is self-calibrating and is not rendered inaccurate by variation of the tube characteristics.

It is also an object of my invention to provide a recording system which is small, cheap and simple, which is not subject to inaccuracies due to mechanical load and friction, and which may be energized from a convenient alternating-current source.

Another object of my invention is to provide an electronic system wherein a feeble alternating-current potential derived in accordance with the movement of a delicate instrument is amplified sufficiently to control relatively heavy apparatus.

Figure 1:
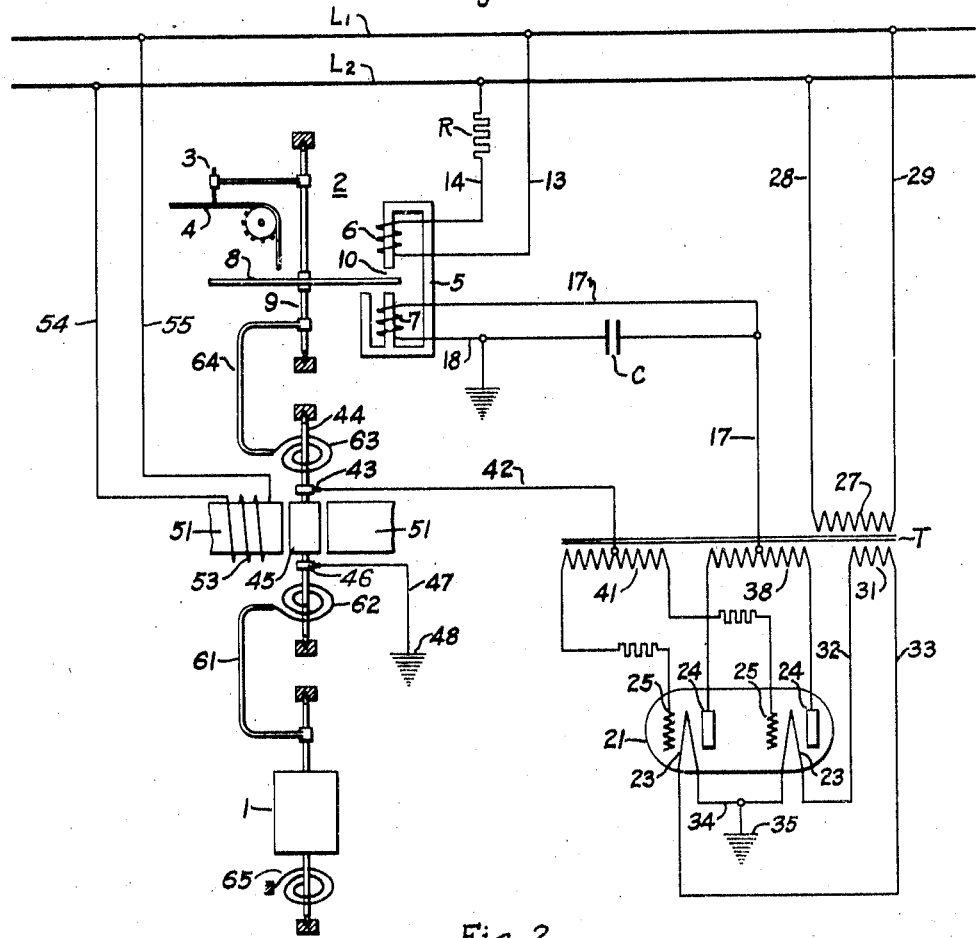
Figure 2:
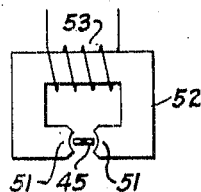

The invention itself, however, both as to its organization and its method of operation, together with additional objects and advantages thereof, will best be understood from the following description of specific embodiments, when read in conjunction with the accompanying drawing, in which:

Figure 1 is a diagrammatic view representing an embodiment of my electronic control system applied to control a device such as a graphic recording meter; and Fig. 2 is a detail view showing a preferred arrangement of the field structure associated with the pick-up coil.

Referring more specifically to the drawing, the apparatus shown in Fig. 1 comprises a pivoted primary element 1 which may be the pivotally mounted rotor of a very sensitive instrument such, for example, as a galvanometer, and a device 2 to be controlled thereby. In the specific embodiment disclosed, the controlled device 2 is a recorder comprising a pen 3 which is operated over a moving paper chart 4 to plot a curve in accordance with the movements of the primary element 1.

The recorder pen 3 is actuated over the paper chart 4 by a two-phase induction motor device comprising a field structure 5 having two windings 6 and 7 thereon, and a metallic disk 8 pivotally mounted on a suitable shaft 9 and having its periphery interposed in an air gap 10 of the field structure. One winding 6 of the recorder motor is connected by suitable conductors 13 and 14 through a series resistor R to the 60 cycle alternating-current service mains $L_1$ and $L_2$ from which it is continuously energized.

One terminal of the other winding 7 of the two-phase motor is connected by suitable conductors 17 into the output circuit of an amplifier 21, and the other side is grounded through a conductor 18. The magnitude of the alternating current component of the direct-current impulses imparted to the motor winding 7 from the amplifier 21 determines the speed with which the motor operates, and the phase instant of the impulses relative to the alternating-current field set up by the other winding 6 determines the direction of rotation.

The amplifier 21 comprises a type "79" tube having two sets of filaments 23, plates 24 and grids 25 within a single evacuated enclosure. A transformer T is provided comprising a primary winding 27 which is energized through suitable conductors 28 and 29 from the same alternating-current service mains $L_1$ and $L_2$ as the alternating-current motor winding. The transformer T has three secondary windings, one winding 31 of which supplies current at a proper potential for heating the filaments 23 to which it may be connected in series relation by suitable conductors 32, 33 and 34. The conductor 34, which is extended directly between the filaments, is preferably grounded as indicated at 35.

One of the transformer secondary windings 38 supplies a high potential suitable for the plates 24, and its terminals are directly connected thereto. A center tap on this high voltage winding 38 is connected directly to the conductor 17 from the direct-current winding 7 on the motor. This winding is preferably shunted by a condenser C having a capacity suitable to tune the inductance of the associated motor winding to resonance at 60 cycles. Hence, although only direct-current impulses are supplied in the plate output circuit, the condenser C serves to supply the other half wave and increases the torque and the efficiency of the motor.

The other one of the secondary windings 41 on the transformer T supplies a low potential for energizing the grids 25 to which its terminals are directly connected. A center tap, which is provided on this winding, is connected by a conductor 42 through a slip ring 43 on a pivoted shaft 44 to a pick-up coil 45 carried thereby, thence through another slip ring connection 46 and by way of a conductor 47 to a ground connection 48 on any suitable metallic part of the chassis of the apparatus. The pick-up coil 45 is pivotally mounted between the pole pieces 51 of a field structure 52 which is provided with a winding 53 which is continually energized from the 60-cycle alternating-current mains through suitable conductors 54 and 55. The shape of the pole pieces 51 is such as to concentrate the flux on the pick-up coil 45 and increase the sensitivity of the device, as shown in Fig. 2.

When the pick-up coil 45 rests in the position shown in Fig. 2, its inductive coupling with the associated alternating-current field is zero, and the only potential applied to the grids 25 of the amplifier are those supplied by the associated grid secondary winding 41 on the transformer. This transformer winding is so connected to the grids that they are alternatively biased negatively at the same instant when their respective associated plates 24 are positive. Hence, if the magnitude of grid potentials is correct, no current flows in the plate output conductor and the direct-current winding 7 of the recorder motor is not energized. In actual practice, it is impossible to apply the exact grid voltage to bias the tubes for zero plate current throughout each cycle. Hence a small plate current flows or rather a succession of direct-current impulses having a frequency of 120 cycles per second. The net torque developed in the motor is zero, however, since it is equal and opposite during alternate half cycles, and the pen 3 does not move on the chart.

In order that the primary element 1 may control the pen, it is connected by a suitable link 61 to a spiral torque spring 62 on the shaft 44 of the pick-up coil. The shaft 9 of the recorder motor is connected to a second spiral torque spring 63 on the shaft of the pick-up coil through a suitable link member 64. The torque of the spiral spring 62 between the primary element and the pick-up coil is preferably about one-twentieth that of the torque in the spring 65 of the primary element movement. The torque of the other spiral spring 63 may be the same.

In operation, assume the primary element 1 to be at its zero position, also the pen 3 to be at zero position on the paper 4 and the torque springs 62 and 63 on the pick-up coil 45 to be so adjusted that the pick-up coil is in its zero inductive position, as shown in Fig. 2. With these conditions, the output of the amplifier is practically zero and, as above set forth, the net torque developed in the motor is zero.

Assume that the primary element now deflects from its zero position. The pick-up coil is rotated slightly, and a 60-cycle voltage is induced therein. This voltage is impressed on the grid biasing alternating-current voltages, since it is in series therewith. Hence, the 60 cycles on one grid 25 increase while that on the other grid 25 decreases, depending upon the polarity of the induced voltage. This causes the plate current from one or the other of the plates 24 to increase or decrease. This increase in the plate current in one plate or the other, depending upon the polarity of the pick-up volts relative to that supplied from the transformer T, causes the motor to rotate forward or backward with a speed proportional to the amount of unbalance caused by the pick-up voltage.

The motor is so connected that it rotates in a direction opposite to the primary element and deflects the pen 3 and also winds up the associated torque spring 63 in opposing relation until it restores the pick-up coil 45 back to its zero position. Since the springs are similar, the rotation of the pen motor will be the same as the deflection of the primary element.

By using springs of different strengths, it is possible to obtain deflections of the pen which are much greater than those of the primary element which is quite desirable in cases where the deflection of the primary element is over a small range and a uniform scale on the chart is desired. If desired, the torque springs may be mounted at other positions than on the shaft of the pick-up coil. The system will operate upon the same principle if suitable resilient means is introduced anywhere in the connection between the primary element and the pick-up coil, and between the pick-up coil and a suitable element of the mechanism driven by the motor. It will be understood that the motor may drive a recorder pen through any of the mechanisms which are common and well known in recorders, and that it may be utilized in accordance with my invention for actuating various control members or devices other than recorder markers.

It will be apparent that the pick-up coil may be very small, since the current which traverses it is negligible, and it may be pivoted between jeweled bearings to minimize friction. After a deflection of the primary element, the recorder motor and the pick-up coil move with a speed which is proportional to the deflection of the primary element, but their velocities slacken gradually as they approach their final positions and they come to rest without overrunning and hunting.

It will be apparent that I have provided a follow-up control system by means of which a very delicate instrument may quickly control comparatively heavy apparatus without overrunning or hunting, which is simple, utilizes vacuum tubes, and is self-calibrating and uninfluenced by variations of the tube characteristics, and which may be conveniently energized from the regular alternating-current service mains.

Although I have shown and described certain specific embodiments of my invention in compliance with the statutes, such embodiments are disclosed merely as specific examples of some of the systems wherein my invention may be applied, and I do not wish to be restricted to the specific structural details, or the specific circuit connections, voltages, frequencies, capacities, and other factors therein set forth, since various other modifications thereof may be effected without departing from the spirit of my invention, and my invention is not to be limited except as necessitated by the prior art and the scope of the appended claims.

I claim as my invention:

1. In apparatus for controlling the position of a movable device in accordance with the position of a movable primary element, a controlling member movable through a range of positions including a normal position, resilient means mechanically connecting said controlling member to said primary element and to said device for moving said controlling member in accordance with a difference of movements of said primary element and said device, means responsive to the deflection of said controlling member from said normal position for moving said device at a rate substantially proportional to said deflection and in a direction to reduce said deflection, whereby said device is brought to a position corresponding to that of said primary element without inertia overtravel.

2. In apparatus for controlling the angular position of a rotatable device in accordance with the angular position of a primary element mounted for independent rotation upon the same axis as said device, a controlling member mounted for independent rotation upon said axis and movable through a range of angular positions including a normal position, a pair of springs connecting said controlling member to said primary element and to said device for rotating said controlling member in accordance with a difference of rotary movements of said primary element and said device, means responsive to the angular deflection of said controlling member from said normal position for rotating said device at a rate substantially proportional to said deflection and in a direction to reduce said deflection, whereby said device is brought to an angular position corresponding to that of said device without inertia overtravel.

3. In apparatus for controlling the position of a movable device in accordance with the position of a movable primary element, translating means having a controlling member operable through a range of positions including a normal position to vary an output energy condition substantially in accordance with the deflection of said member from said normal position, resilient means mechanically connecting said controlling member to said primary element and to said device for moving said controlling member in accordance with a difference of movements of said primary element and said device, and means for moving said device at a rate substantially proportional to said energy condition and in a direction to reduce said deflection, whereby said device is brought to a position corresponding to that of said primary element without inertia overtravel.

4. In recording apparatus, a movable recording device, a movable primary element, translating means having a controlling member operable through a range of positions including a normal position to vary an output energy condition substantially in accordance with the deflection of said controlling member from said normal position, amplifying means responsive to said output energy condition of said translating means, resilient means mechanically connecting said controlling member to said primary element and to said device for moving said controlling member in accordance with a difference of movements of said primary element and said device, and motive means energized from said amplifying means for moving said device at a rate substantially proportional to said energy condition and in a direction to reduce said deflection, whereby said device is brought to a position corresponding to that of said primary element without inertia overtravel.

5. In recording apparatus, a rotatable recording device, a primary element mounted for independent rotation upon the same axis as said device, translating means having a controlling member mounted for independent rotation upon said axis and movable through a range of angular positions including a normal position to vary an electrical output condition substantially in accordance with the deflection of said controlling member from said normal position, thermionic amplifying means responsive to said electrical output condition of said translating means, a pair of springs connecting said controlling member to said primary element and to said recording device for rotating said controlling member in accordance with a difference of rotary movements of said primary element and said device, and an electric motor energized from said amplifying means for rotating said device at a rate substantially proportional to said electrical output condition and in a direction to reduce said deflection.

HENRY L. BERNARDE.